Nov. 2, 1954
F. KOPPELMANN
2,693,574
ARRANGEMENT FOR MEASURING THE MAGNETIC
PROPERTIES OF METAL SHEETS
Filed April 25, 1951
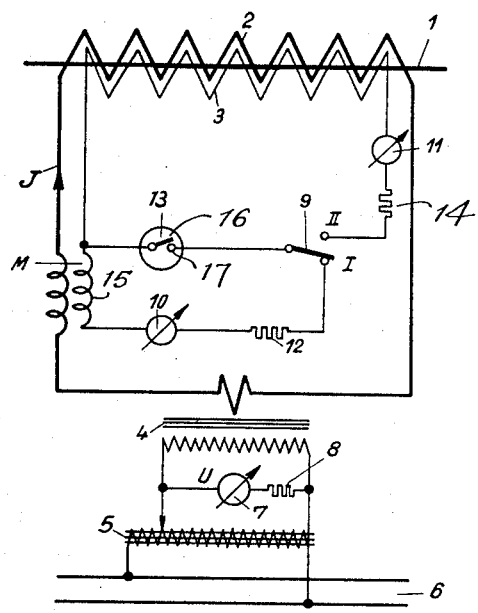
Inventor:
Floris Koppelmann
By: Michael S. Striker
agt

United States Patent Office 2,693,574
Patented Nov. 2, 1954

2,693,574
ARRANGEMENT FOR MEASURING THE MAGNETIC PROPERTIES OF METAL SHEETS

Floris Koppelmann, Berlin-Siemensstadt, Germany, assignor to Licentia Patent-Verwaltungs-G. m. b. H., a corporation of Germany Application April 25, 1951, Serial No. 222,847

Claims priority, application Germany April 28, 1950

13 Claims. (Cl. 324—34)

The present invention relates to an arrangement for measuring the magnetic properties of a metal sheet and more particularly to an arrangement for measuring the magnetizability, the magnetic losses, or the permeability of a metal sheet.

It is an object of the present invention to provide an arrangement allowing to measure the magnet properties of a metal sheet without taking relatively small samples of the sheet which is the practice hitherto used in connection with Epstein's apparatus for ascertaining the magnetic properties of sheets and the like. The analysing of samples involves undesirable expenditure of labor and material and influences the magnetic properties, for instance the magnetic losses in an uncontrollable manner.

It is another object of the present invention to provide an arrangement for measuring exactly the magnetic properties of a metal sheet, such as the magnetic losses thereof, with a single measuring operation.

It is a further object of the present invention to provide an arrangement which is simple and easy to operate so that the measurement can be carried out in a rolling mill or a storage room by a person who has undergone a little training in the handling of the arrangement according to the present invention.

The present invention consists in its broadest aspect in an arrangement for measuring the magnetic properties of a metal sheet comprising in combination an open winding adapted to surround the metal sheet, means for passing a current through the open winding, the current magnetizing the metal sheet, and means for deriving from the current the magnetic properties of the metal sheet.

Preferably the current passed through the open winding is an alternating current.

Preferably means are provided for measuring the alternating current, for instance the instantaneous value thereof.

In a preferred embodiment of the present invention the means for measuring the instantaneous value of the alternating current includes rhythmically closing and opening contact means.

The metal sheet forms preferably the core of the open winding.

A preferred embodiment of the present invention comprises in combination an open winding adapted to surround the metal sheet so that the same forms the core of the open winding, an inductor connected in series to the open winding, means for passing an alternating current through the open winding and the inductor connected in series thereto so as to magnetize the sheet surrounded by, and forming the core of, the open winding, a measuring contact means, means for rhythmically opening and closing the measuring contact means, means for adjusting the phase position of the closing of the measuring contact means with respect to the alternating current passed through the open winding and the inductor; a galvanometer; a current measuring instrument, means including a switch having a first operative position and a second operative position, means for passing an alternating current in series through the open winding, the galvanometer, the switch in the first operative position thereof, and the measuring contact means, and means for passing an alternating current in series through the inductor, the current measuring instrument, the switch in the second position thereof, and the measuring contact means, whereby in order to measure the coercive force of the sheet, first an alternating current is passed through the open winding, the galvanometer, the switch in the first operative position thereof, and the measuring contact means, then the phase position of the closing of the measuring contact means is adjusted by the adjusting means so that the galvanometer indicates zero deflection, then the switch is brought into the second operative position thereof, thereby connecting the measuring contact in series to the current measuring instrument, and finally an indication is taken from the current measuring instrument.

In a preferred embodiment of the present invention a first open winding and a second open winding inductively coupled thereto are provided; the first open winding being connected in series to the inductor whereas the second open winding is connected in series to the galvanometer.

Preferably the inductor has a secondary element connected in series with a current measuring instrument.

In a preferred embodiment of the present invention a step-down transformer having a primary and a secondary having a number of turns being small in comparison to the number of turns of the primary is provided whereby the first open winding is supplied with current by the secondary of said step-down transformer.

Preferably a voltage measuring instrument is connected across the primary of the step-down transformer.

In a preferred embodiment of the present invention an auto-transformer having an adjustable secondary circuit is provided and the step-down transformer is connected with the primary thereof to the adjustable secondary circuit of the auto-transformer.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

The only figure is a wiring diagram of an embodiment of the present invention.

Referring now to the drawing, 1 is a metal sheet having dimensions of 1500 by 750 by 4.35 mm., for instance. A magnetizing winding 2 made of insulated cover band forms a flat coil surrounding the metal sheet 1 and extending almost over the total length thereof. The magnetizing winding 2 is termed hereinafter the first open winding and the turns thereof are equally distributed over almost the total length of the metal sheet 1.

An inductance winding 3 termed hereinafter the second open winding is inductively coupled with the magnetizing winding 1. The winding 3 consists of insulated wire and has the same number of turns as the magnetizing winding 2. The turns of the inductance winding 3 are uniformly distributed over practically the whole length of the metal sheet 1.

M is an inductor inserted in series between the secondary of a step-down transformer 4 and the magnetizing winding 2. The secondary of the transformer 4 supplies only a voltage of a few volts. The primary of the step-down transformer 4 is connected to the adjustable secondary circuit of an auto-transformer 5 the primary circuit of which is connected to the alternating mains 6.

A soft iron instrument 7 is connected in series with a resistor 8 across the primary of the step-down transformer 4 and measures the voltage across the same. The adjustable secondary circuit of the auto-transformer 5 is adjusted in such a manner that the mean induction over the length of the metal sheet 1 amounts to a predetermined value, such as 10,000 gauss.

The voltmeter 7 is preferably calibrated according to the weight of the metal sheet 1 taken in kilograms or pounds. Actually it is the voltage across the magnetizing winding 2 which is proportional to the weight of the metal sheet 1 at a predetermined inductance. However, to measure the voltage directly at the terminals of the magnetizing winding 2 is not feasible on account of the small value of this voltage. For these reasons the voltmeter 7 is arranged in the primary circuit of the step-down transformer 4, the primary voltage of the step-down transformer 4 being proportional to the weight of the metal sheet 1 since the primary voltage of the step-down transformer 4 is in a predetermined ratio to the secondary voltage thereof. It is true that the voltmeter 7 measures a voltage proportional to that across the magnetizing winding 2 and the inductor M. However, the inductance of the latter is only small in comparison to the impedance of the magnetizing winding 2 so that the error due to the inductor M is negligible.

One terminal of the inductance winding 3 is connected to a galvanometer 11 connected in series to a resistor 14 connected in series to a stationary contact II of a switch 9 the movable contact of which is connected to the stationary contact 17 of a measuring contact means 13 having a movable contact 16 connected to the other terminal of the inductance winding 3. The measuring contact means 13 is described more in detail in the co-pending application Serial No. 141,638 filed February 1, 1950, for a Mechanical Rectifier and is more particularly shown in Figs. 1, 2, and 3 of this application. The measuring contact means is controlled by a synchronous motor (not shown) having an adjustable stator (not shown) and driving an eccentric (not shown) driving the movable contact 16 so as to open and close the measuring contact means 13 at predetermined times, respectively, the distance in time of which can be adjusted to any value below one-half wave of a cycle, the closing time being shiftable by adjusting the stator (not shown) so that the contact means 13 is closed at an arbitrary moment as explained more in detail in connection with Figs. 5 and 6 of the co-pending application Serial No. 141,638, filed February 1, 1950, to which reference is made for a more detailed description of the measuring contact means. By means of the measuring contact 13 means the closing and opening of the circuit can be adjusted accurately to an amount corresponding to one degree of an electrical cycle and the phase position of the closing instant can be shifted with respect to the alternating current by adjusting the stator (not shown) of the synchronous motor (not shown) driving the eccentric (not shown) actuating the movable contact 16 of the measuring contact means 13.

The inductor M is provided with a secondary element 15 the terminals of which are connected, respectively, to the movable contact 16 of the measuring contact 13 and to a moving coil instrument 10 connected in series to a resistor 12 and the stationary contact I of the switch 9. It will be understood that in the first position of the switch 9 the circuit including the galvanometer 11 and the inductance winding 3 is closed, the circuit over the secondary element 15 and the moving coil instrument 10 being open. As soon as the movable contact of switch 9 comes into contact with the stationary contact I the circuit including the inductance winding 3 and the galvanometer 11 is interrupted, the secondary element 15 of the inductor M and the moving coil instrument 10 forming a closed circuit with the resistor 12, switch 9 in contact with stationary contact I, and the measuring contact means 13.

The operation of this arrangement is as follows:

If it is intended to measure the magnetic properties of a metal sheet 1, for instance the magnetic losses or the magnetizability thereof, the same is inserted into the open windings 2 and 3. An alternating current is supplied by the mains 6 to the primary circuit of the auto-transformer 5 the secondary circuit of which feeds the primary of the step-down transformer 4 the secondary of which is connected over the inductor M to the magnetizing winding 2. The primary voltage of the transformer 4 is adjusted as is more fully described hereinabove so that the mean induction in the metal sheet 1 is about 10,000 gauss. The voltmeter 7 connected to the primary of the step-down transformer 4 is calibrated in weights of the metal sheet 1 as explained hereinabove.

The step-down transformer 4 sends a current J through the magnetizing winding 2 which at a certain instant has a direction indicated by the arrow. The inductance winding 3 which has the same number of turns and the same distribution thereof as the magnetizing winding 2 is coupled with the same so that the voltage induced in the inductance winding 3 is equal to the voltage across the magnetizing 2. Now the switch 9 is brought into a first position thereof in which the same is in contact with the stationary contact II thereby closing a circuit including the measuring contact means 13 and the galvanometer 11. The measuring contact means 13 is adjusted in the manner more fully described in the co-pending application Serial No. 141,638 filed February 1, 1950, so that the galvanometer 11 indicates zero current. Then the switch 9 is switched over to the second position thereof in which the same makes contact with the stationary contact I thereby interrupting the circuit over the galvanometer 11 and closing a circuit including the secondary element 15 of the inductor M and the moving coil instrument 10. The secondary element 15 has a number of turns equal to that of the primary thereof; in consequence thereof the moving coil instrument 10 measures a current equal to a part of the current flowing in the magnetizing winding 2 and the inductor M which is cut out of the cycle by the measuring contact means 13. Since the latter was adjusted so that the galvanometer 11 does not indicate any deflection the current measured after switching over the switch 9 into the second position thereof is the current flowing at the moment at which the induction in the metal sheet 1 is zero, this current being a measure for the coercive force of the metal sheet 1 and therefore substantially proportional to the magnetic losses of the metal sheet 1. The series resistor 12 is preferably so calibrated that the measuring instrument 10 shows directly the magnetic losses of the metal sheet 1. This calibration is carried out by inserting into the magnetizing winding 2 a metal sheet the magnetic losses of which are known.

If desired the inductor M which is only small can have a primary winding only, the connections with the current measuring instrument 10 and the movable contact 16 of the measuring contact means 13 being directly connected to the terminals of the inductor. Similarly the windings 2 and 3 need not be separate but could be replaced by a single winding.

Since, as a rule, the distribution of the magnetic induction over the length of the metal sheet is not constant, the arrangement according to the invention does not measure the magnetic losses at an induction of 10,000 gauss but at a mean value lying between nought and 12,000 gauss. Furthermore, since the instantaneous value of the magnetizing current, that is, the width of the hysteresis loop including the eddy current losses, is substantially a measure for the magnetic losses an exact measurement would require to consider the width of the loop at other inductions which are different from zero.

As stated hereinabove, the voltage measuring voltage instrument 7 indicates the voltage drop across the inductor M and the ohmic and inductive resistance of the magnetizing winding 2. Thus for sheets having a larger magnetizing current, i. e. a small permeability, a smaller mean induction is adjusted than for sheets having a large permeability. If, however, one is contented with measuring the magnetic properties of approximately similar metal sheets the mean values of the just mentioned differences can be taken into consideration by the calibration. The remaining error has been shown by actual measurements to be of the order of a few percent.

The method of measuring the magnetic losses by the arrangement according to the invention involves the advantage that the instrument 10 can be a rough switchboard instrument with large deflections which can be directly read. The influence of the non-uniform distribution of the induction along the length of the metal sheet which is the cause of the greatest uncertainty of the measurement is, however, relatively small. Exact measurements have shown that the total losses of a non-uniformly magnetized sheet (maximum induction 12,000 gauss) deviate only by a few percent from the value which would be obtained at a uniform magnetization of 10,000 gauss. Thus, by a non-uniform magnetization no larger error than about three percent is to be expected by a measurement with the arrangement according to the invention.

The described arrangement can also be used for measuring the permeability of iron cores. To this end the current intensity is measured on the primary side of transformer 4 and from this the magnetic field intensity is calculated with the aid of the number of turns of the magnetizing winding 2 and the length of the magnetic path in the iron. On the secondary side of the transformer 4 the voltage is measured. The measuring contact integrates the voltage with respect to time. The integral is a measure for the peak value of the induction in the iron. In this way the field intensity and induction and thus the two values required for calculating the permeability are obtained.

Instead of a metal sheet an endless band could be inserted into the magnetizing and inductance windings. In all cases the indicating instruments can be calibrated empirically by inserting metal sheets or bands of known properties into the windings.

It will be understood that each of the elements described above, or two or more together, may also find a useful application in other types of arrangements for measuring the magnetic properties of a metal sheet differing from the types described above.

While the invention has been illustrated and described as embodied in an arrangement for measuring the magnetic losses of metal sheets, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An arrangement for measuring the magnetic properties of a metal sheet, comprising in combination, an open winding adapted to surround the metal sheet, the metal sheet forming the core of said open winding; an inductor connected in series to said open winding; means for passing an alternating current through said open winding and said inductor connected in series thereto so as to magnetize the sheet surrounded by, and forming the core of, said open winding; a measuring contact means; means for rhythmically closing said measuring contact means for substantially an instant only; means for adjusting the phase position of the closing of said measuring contact means with respect to the alternating current passed through said open winding and said inductor; a galvanometer; a current measuring instrument; means including a switch having a first operative position and a second operative position; means for passing an alternating current in series through said open winding, said galvanometer, said switch in the first operative position thereof, and said measuring contact means; and means for passing an alternating current in series through said inductor, said current measuring instrument, said switch in the second operative position thereof, and said measuring contact means, whereby in order to measure the coercive force of the sheet an alternating current is passed through said open winding, said galvanometer, said switch in the first operative position thereof, and said measuring contact means, and the phase position of the closing of said measuring contact means is adjusted by said adjusting means so that said galvanometer indicates zero deflection, then said switch is brought into the second operative position thereof thereby connecting said measuring contact means in series to said current measuring instrument, and finally an indication is taken from said current measuring instrument.

2. An arrangement for measuring the magnetic properties of a metal sheet, comprising in combination, a first open winding; a second open winding inductively coupled thereto, said open windings being adapted to surround the metal sheet, the metal sheet forming the core of said open windings; an inductor connected in series to said first open winding; means for passing an alternating current through said first open winding and said inductor connected in series thereto so as to magnetize the sheet surrounded by, and forming the core of, said open windings; a measuring contact means; means for rhythmically closing said measuring contact means for substantially an instant only; means for adjusting the phase position of the closing of said measuring contact means with respect to the alternating current passed through said first open winding and said inductor; a galvanometer; a current measuring instrument; means including a switch having a first operative position and a second operative position; means for passing an alternating current in series through said second open winding, said galvanometer, said switch in the first operative position thereof, and said measuring contact means; and means for passing an alternating current in series through said inductor, said current measuring instrument, said switch in the second operative position thereof, and said measuring contact means, whereby in order to measure the coercive force of the sheet an alternating current is passed through said first open winding and converted into an alternating current passing through said second open winding, said galvanometer, said switch in the first operative position thereof, and said measuring contact means and the phase position of the closing of said measuring contact means is adjusted by said adjusting means so that said galvanometer indicates zero deflection, then said switch is brought into the second operative position thereof thereby connecting said measuring contact means in series to said current measuring instrument, and finally an indication is taken from said current measuring instrument.

3. An arrangement for measuring the magnetic properties of a metal sheet, comprising in combination, an open winding adapted to surround the metal sheet, the metal sheet forming the core of said open winding; an inductor connected in series to said open winding, said inductor having a secondary element; means for passing an alternating current through said open winding and said inductor connected in series thereto so as to magnetize the sheet surrounded by, and forming the core of, said open winding; a measuring contact means; means for rhythmically closing said measuring contact means for substantially an instant only; means for adjusting the phase position of the closing of said measuring contact means with respect to the alternating current passed through said open winding and said inductor; a galvanometer; a current measuring instrument; means including a switch having a first operative position and a second operative position; means for passing an alternating current in series through said open winding, said galvanometer, said switch in the first operative position thereof, and said measuring contact means; and means for passing an alternating current in series through said secondary element of said inductor, said current measuring instrument, said switch in the second operative position thereof, and said measuring contact means, whereby in order to measure the coercive force of the sheet an alternating current is passed through said open winding, said galvanometer, said switch in the first operative position thereof, and said measuring contact means and the phase position of the closing of said measuring contact means is adjusted by said adjusting means so that said galvanometer indicates zero deflection, then said switch is brought into the second operative position thereof thereby connecting said measuring contact means in series to said current measuring instrument and said secondary element of said inductor, and finally an indication is taken from said current measuring instrument.

4. An arrangement for measuring the magnetic properties of a metal sheet, comprising in combination, a first open winding; a second open winding inductively coupled thereto, said open windings being adapted to surround the metal sheet, the metal sheet forming the core of said open windings; an inductor connected in series to said first open winding, said inductor having a secondary element; means for passing an alternating current through said first open winding and said inductor connected in series thereto so as to magnetize the sheet surrounded by, and forming the core of, said open windings; a measuring contact means; means for rhythmically closing said measuring contact means for substantially an instant only; means for adjusting the phase position of the closing of said measuring contact means with respect to the alternating current passed through said first open winding and said inductor; a galvanometer; a current measuring instrument; means including a switch having a first operative position and a second operative position; means for passing an alternating current in series through said second open winding, said galvanometer, said switch in the first operative position thereof, and said measuring contact means; and means for passing an alternating current in series through said secondary element of said inductor, said current measuring instrument, said switch in the second operative position thereof, and said measuring contact means, whereby in order to measure the coercive force of the sheet an alternating current is passed through said first open winding and converted into an alternating current passing through said second open winding, said galvanometer, said switch in the first operative position thereof, and said measuring contact means and the phase position of the closing of said measuring contact means is adjusted by said adjusting means so that said galvanometer indicates zero deflection, then said switch is brought into the second operative position thereof thereby connecting said measuring contact means in series to said current measuring instrument and said secondary element of said inductor, and finally an indication is taken from said current measuring instrument.

5. An arrangement for measuring the magnetic properties of a metal sheet, comprising in combination, a first open winding; a second open winding inductively coupled thereto, said open windings having equal numbers of turns and being adapted to surround the metal sheet, the metal sheet forming the core of said open windings; an inductor connected in series to said first open winding; means for passing an alternating current through said first open winding and said inductor connected in series thereto so as to magnetize the sheet surrounded by, and forming the core of, said open windings; a measuring contact means; means for rhythmically closing said measuring contact means for substantially an instant only; means for adjusting the phase position of the closing of said measuring contact means with respect to the alternating current passed through said first open winding and said inductor; a galvanometer; a current measuring instrument; means including a switch having a first operative position and a second operative position; means for passing an alternating current in series through said second open winding, said galvanometer, said switch in the first operative position thereof, and said measuring contact means; and means for passing an alternating current in series through said inductor, said current measuring instrument, said switch in the second operative position thereof, and said measuring contact means, whereby in order to measure the coercive force of the sheet an alternating current is passed through said first open winding and converted into an alternating current passing through said second open winding, said galvanometer, said switch in the first operative position thereof, and said measuring contact means and the phase position of the closing of said measuring contact means is adjusted by said adjusting means so that said galvanometer indicates zero deflection, then said switch is brought into the second operative position thereof thereby connecting said measuring contact means in series to said current measuring instrument, and finally an indication is taken from said current measuring instrument.

6. An arrangement for measuring the magnetic properties of a metal sheet, comprising in combination, a first open winding; a second open winding inductively coupled thereto, said open windings having equal numbers of turns and being adapted to surround the metal sheet, the metal sheet forming the core of said open windings; an inductor connected in series to said first open winding, said inductor having a secondary element; means for passing an alternating current through said first open winding and said inductor connected in series thereto so as to magnetize the sheet surrounded by, and forming the core of, said open windings; a measuring contact means; means for rhythmically closing said measuring contact means for substantially an instant only; means for adjusting the phase position of the closing of said measuring contact means with respect to the alternating current passed through said first open winding and said inductor; a galvanometer; a current measuring instrument; means including a switch having a first operative position and a second operative position; means for passing an alternating current in series through said second open winding, said galvanometer, said switch in the first operative position thereof, and said measuring contact means; and means for passing an alternating current in series through said secondary element of said inductor, said current measuring instrument, said switch in the second operative position thereof, and said measuring contact means, whereby in order to measure the coercive force of the sheet an alternating current is passed through said first open winding and converted into an alternating current passing through said second open winding, said galvanometer, said switch in the first operative position thereof, and said measuring contact means and the phase position of the closing of said measuring contact means is adjusted by said adjusting means so that said galvanometer indicates zero deflection, then said switch is brought into the second operative position thereof thereby connecting said measuring contact means in series to said current measuring instrument and said secondary element of said inductor, and finally an indication is taken from said current measuring instrument.

7. An arrangement for measuring the magnetic properties of a metal sheet, comprising in combination, a step-down transformer having a primary and a secondary having a number of turns being small in comparison to the number of turns of said primary; a first open winding supplied with current by said secondary of said step-down transformer; a second open winding inductively coupled thereto, said open windings having equal numbers of turns and being adapted to surround the metal sheet, the metal sheet forming the core of said open windings; an inductor connected in series to said first open winding, said inductor having a secondary element; means for passing an alternating current through said first open winding and said inductor connected in series thereto so as to magnetize the sheet surrounded by, and forming the core of, said open windings; a measuring contact means; means for rhythmically closing said measuring contact means for substantially an instant only; means for adjusting the phase position of the closing of said measuring contact means with respect to the alternating current passed through said first open winding and said inductor; a galvanometer; a current measuring instrument; means including a switch having a first operative position and a second operative position; means for passing an alternating current in series through said second open winding, said galvanometer, said switch in the first operative position thereof, and said measuring contact means; and means for passing an alternating current in series through said secondary element of said inductor, said current measuring instrument, said switch in the second operative position thereof, and said measuring contact means, whereby in order to measure the coercive force of the sheet an alternating current is passed through said first open winding and converted into an alternating current passing through said second open winding, said galvanometer, said switch in the first operative position thereof, and said measuring contact means and the phase position of the closing of said measuring contact means is adjusted by said adjusting means so that said galvanometer indicates zero deflection, then said switch is brought into the second operative position thereof thereby connecting said measuring contact means in series to said current measuring instrument and said secondary element of said inductor, and finally an indication is taken from said current measuring instrument.

8. An arrangement for measuring the magnetic properties of a metal sheet, comprising in combination, a step-down transformer having a primary and a secondary having a number of turns being small in comparison to the number of turns of said primary; a voltage measuring instrument connected across said primary of said step-down transformer; a first open winding supplied with current by said secondary of said step-down transformer; a second open winding inductively coupled thereto, said open windings having equal numbers of turns and being adapted to surround the metal sheet, the metal sheet forming the core of said open windings; an inductor connected in series to said first open winding, said inductor having a secondary element; means for passing an alternating current through said first open winding and said inductor connected in series thereto so as to magnetize the sheet surrounded by, and forming the core of, said open windings; a measuring contact means; means for rhythmically closing said measuring contact means for substantially an instant only; means for adjusting the phase position of the closing of said measuring contact means with respect to the alternating current passed through said first open winding and said inductor; a galvanometer; a current measuring instrument; means including a switch having a first operative position and a second operative position; means for passing an alternating current in series through said second open winding, said galvanometer, said switch in the first operative position thereof, and said measuring contact means; and means for passing an alternating current in series through said secondary element of said inductor, said current measuring instrument, said switch in the second operative position thereof, and said measuring contact means, whereby in order to measure the coercive force of the sheet an alternating current is passed through said first open winding and converted into an alternating current passing through said second open winding, said galvanometer, said switch in the first operative position thereof, and said measuring contact means and the phase position of the closing of said measuring contact means is adjusted by said adjusting means so that said galvanometer indicates zero deflection, then said switch is brought into the second operative position thereof thereby connecting said measuring contact means in series to said current measuring instrument and said secondary element of said inductor, and finally an indication is taken from said current measuring instrument.

9. An arrangement for measuring the magnetic properties of a metal sheet, comprising in combination, an auto-transformer having an adjustable secondary circuit; a step-down transformer having a primary connected to said adjustable secondary circuit of said auto-transformer; a secondary forming part of said step-down transformer and having a number of turns being small in comparison to the number of turns of said primary; a voltage measuring instrument connected across said primary of said step-down transformer; a first open winding supplied with current by said secondary of said step-down transformer; a second open winding inductively coupled thereto, said open windings having equal numbers of turns and being adapted to surround the metal sheet, the metal sheet forming the core of said open windings; an inductor connected in series to said first open winding, said inductor having a secondary element; means for passing an alternating current through said first open winding and said inductor connected in series thereto so as to magnetize the sheet surrounded by, and forming the core of, said open windings; a measuring contact means; means for rhythmically closing said measuring contact means for substantially an instant only; means for adjusting the phase position of the closing of said measuring contact means with respect to the alternating current passed through said first open winding and said inductor; a galvanometer; a current measuring instrument; means including a switch having a first operative position and a second operative position; means for passing an alternating current in series through said second open winding, said galvanometer, said switch in the first operative position thereof, and said measuring contact means; and means for passing an alternating current in series through said secondary element of said inductor, said current measuring instrument, said switch in the second operative position thereof, and said measuring contact means, whereby in order to measure the coercive force of the sheet an alternating current is passed through said first open winding and converted into an alternating current passing through said second open winding, said galvanometer, said switch in the first operative position thereof, and said measuring contact means and the phase position of the closing of said measuring contact means is adjusted by said adjusting means so that said galvanometer indicates zero deflection, then said switch is brought into the second operative position thereof thereby connecting said measuring contact means in series to said current measuring instrument and said secondary element of said inductor, and finally an indication is taken from said current measuring instrument.

10. An arrangement for measuring the magnetic properties of a metal sheet, comprising, in combination, an open winding adapted to surround the metal sheet; an inductor connected in series to said open winding; means for passing an alternating current through said open winding and said inductor connected in series thereto so as to magnetize the sheet surrounded by said open winding; a measuring contact means; means for rhythmically closing said measuring contact means for substantially an instant only; means for adjusting the phase position of the closing of said measuring contact means with respect to the alternating current passed through said open winding and said inductor; a galvanometer; means for passing an alternating current in series through said open winding, said galvanometer, and said measuring contact means; and means including current measuring means for passing an alternating current in series through said inductor, said current measuring means, and said measuring contact means, whereby in order to measure the coercive force of the sheet an alternating current is passed through said open winding, said galvanometer and said measuring contact means and the phase position of the closing of said measuring contact means is adjusted by said adjusting means so that said galvanometer indicates zero deflection, and then by connecting said measuring contact means in series to said current measuring means an indication is taken from said current measuring means.

11. An arrangement for measuring the magnetic properties of a metal sheet, comprising, in combination, a first open winding; a second open winding inductively coupled thereto, said open winding being adapted to surround the metal sheet; an inductor connected in series to said first open winding; means for passing an alternating current through said first open winding and said inductor connected in series thereto so as to magnetize the sheet surrounded by said first open winding; a measuring contact means; means for rhythmically closing said measuring contact means for substantially an instant only; means for adjusting the phase position of the closing of said measuring contact means with respect to the alternating current passed through said first open winding and said inductor; a galvanometer; means for passing an alternating current in series through said second open winding, said galvanometer, and said measuring contact means; and means including current measuring means for passing an alternating current in series through said inductor, said current measuring means, and said measuring contact means, whereby in order to measure the coercive force of the sheet an alternating current is passed through said first open winding and converted into an alternating current passing through said second open winding, said galvanometer and said measuring contact means and the phase position of the closing of said measuring contact means is adjusted by said adjusting means so that said galvanometer indicates zero deflection, and then by connecting said measuring contact means in series to said current measuring means an indication is taken from said current measuring means.

12. An arrangement for measuring the magnetic properties of a metal sheet, comprising, in combination, an open winding adapted to surround the metal sheet; an inductor connected in series to said open winding, said inductor having a secondary element; means for passing an alternating current through said open winding and said inductor connected in series thereto so as to magnetize the sheet surrounded by said open winding; a measuring contact means; means for rhythmically closing measuring contact means for substantially an instant only; means for adjusting the phase position of the closing of said measuring contact means with respect to the alternating current passed through said open winding and said inductor; a galvanometer; means for passing an alternating current in series through said open winding, said galvanometer, and said measuring contact means; and means including current measuring means for passing an alternating current in series through said secondary element of said inductor, said current measuring means, and said measuring contact means, whereby in order to measure the coercive force of the sheet an alternating current is passed through said open winding, said galvanometer and said measuring contact means and the phase position of the closing of said measuring contact means is adjusted by said adjusting means so that said galvanometer indicates zero deflection, and then by connecting said measuring contact means in series to said current measuring means and said secondary element of said inductor an indication is taken from said current measuring means.

13. An arrangement for measuring the magnetic properties of a metal sheet, comprising, in combination, a first open winding; a second open winding inductively coupled thereto, said open winding being adapted to surround the metal sheet; an inductor connected in series to said first open winding, said inductor having a secondary element; means for passing an alternating current through said first open winding and said inductor connected in series thereto so as to magnetize the sheet surrounded by said first open winding; a measuring contact means; means for rhythmically closing said measuring contact means for substantially an instant only; means for adjusting the phase position of the closing of said measuring contact means with respect to the alternating current passed through said first open winding and said inductor; a galvanometer; means for passing an alternating current in series through said second open winding, said galvanometer, and said measuring contact means; and means including current measuring means for passing an alternating current in series through said secondary element of said inductor, said current measuring means, and said measuring contact means, whereby in order to measure the coercive force of the sheet an alternating current is passed through said first open winding and converted into an alternating current passing through said second open winding, said galvanometer and said measuring contact means and the phase position of the closing of said measuring contact means is adjusted by said adjusting means so that said galvanometer indicates zero deflection, and then by connecting said measuring contact means in series to said current measuring means and said secondary element of said inductor an indication is taken from said current measuring means.

References Cited in the file of this patent

UNITED STATES PATENTS

| Number | Name | Date |
|---|---|---|
| 1,596,615 | Malmberg et al. | Aug. 17, 1926 |
| 2,134,539 | Thal | Oct. 25, 1938 |
| 2,283,742 | Leonard | May 19, 1942 |
| 2,329,811 | Zuschlag | Sept. 21, 1943 |
| 2,337,231 | Cloud | Dec. 21, 1943 |
| 2,455,792 | Meunier | Dec. 7, 1948 |
| 2,505,701 | Zuschlag | Apr. 25, 1950 |